(12) United States Patent
Saarinen et al.

(10) Patent No.: US 7,702,849 B2
(45) Date of Patent: Apr. 20, 2010

(54) METHOD AND APPARATUS FOR DIVIDING AND STORING DATA INTO PLURAL FILES

(75) Inventors: Pertti Saarinen, Konginkangas (FI); Osmo Schroderus, Sumiainen (FI)

(73) Assignee: Nokia Corporation, Espoo (FI)

( * ) Notice: Subject to any disclaimer, the term of this patent is extended or adjusted under 35 U.S.C. 154(b) by 424 days.

(21) Appl. No.: 11/660,331

(22) PCT Filed: Sep. 3, 2004

(86) PCT No.: PCT/FI2004/050126
§ 371 (c)(1),
(2), (4) Date: Feb. 12, 2007

(87) PCT Pub. No.: WO2006/024688
PCT Pub. Date: Mar. 9, 2006

(65) Prior Publication Data
US 2008/0077738 A1 Mar. 27, 2008

(51) Int. Cl.
G06F 12/02 (2006.01)
(52) U.S. Cl. .................. 711/112; 711/170; 711/171; 711/172
(58) Field of Classification Search .............. None
See application file for complete search history.

(56) References Cited

U.S. PATENT DOCUMENTS

| | | | |
|---|---|---|---|
| 6,587,634 B2 * | 7/2003 | Maltz et al. ............... | 386/46 |
| 6,832,293 B1 * | 12/2004 | Tagawa et al. ............ | 711/115 |
| 2001/0032293 A1 | 10/2001 | Korst et al. .............. | 711/112 |
| 2002/0156912 A1 * | 10/2002 | Hurst et al. ............... | 709/236 |
| 2003/0065866 A1 | 4/2003 | Spencer .................... | 710/306 |
| 2003/0097520 A1 | 5/2003 | Lai et al. .................. | 711/103 |
| 2003/0105918 A1 | 6/2003 | Plourde, Jr. .............. | 711/112 |
| 2005/0069292 A1 * | 3/2005 | Yokota et al. ............. | 386/95 |

FOREIGN PATENT DOCUMENTS

| KR | 20020002106 | 7/2003 |
|---|---|---|
| KR | 20030091869 | 6/2005 |
| KR | 20040098692 | 6/2006 |

* cited by examiner

Primary Examiner—Than Nguyen
(74) Attorney, Agent, or Firm—Harrington & Smith

(57) ABSTRACT

The invention relates to a method for storing data (DATA) on a memory medium (MEM). The data (DATA) forms a file totality (FILE) and the memory medium (MEM) includes several unit-storage areas (U1-U10). At least one first bookkeeping (FDE, FAT) is maintained of the storage state of the memory medium, which consists of information of the location in the unit-storage areas of the data belonging to each file totality. In the storing process—the data is stored in the unit storage areas and—the said first bookkeeping, for example, concerning the location of the data in the unit storage areas, is updated. The data forming the said file totality is stored as file parts (file1, file2, fileN), on the data (data1, data2, . . . , dataN) of which the said storing process is performed.

12 Claims, 6 Drawing Sheets

METHOD AND APPARATUS FOR DIVIDING AND STORING DATA INTO PLURAL FILES

FIELD OF THE INVENTION

The present invention relates to a method for storing data on a memory medium, which data forms a file totality and the memory medium includes several unit-storage areas and at least one first bookkeeping is maintained of the storage state of which memory medium, which consists of information of the location of the data belonging to the each file totality, and in which storing process
 data is stored in unit storage areas and
 the said first bookkeeping, for example, concerning the location of the data in the unit storage areas, is updated.

In addition, the invention also relates to a corresponding electronic device and program product for implementing the method according to the invention.

BACKGROUND OF THE INVENTION

In portable devices, such as, for example, mobile stations, video clips, for example, can be stored on a memory card or similar memory medium. However, according to the prior art, while video capture is taking place, the data is not yet stored on the memory medium in such a way that it could be, for instance, read from it afterwards. This is due to the memory-medium bookkeeping of the prior art and its updating practice in connection with the storing process.

The storing, or rather the updating of the bookkeeping of the memory medium to correspond to the data stored on it, takes place only in connection with the termination of the storing process, i.e. clearly after the actual performance of the video imaging. In the same time, a name or similar identifier for the stored file is created only at this stage. One example of this kind of bookkeeping is the memory medium's space allocation table, i.e. FAT (File Allocation Table) and the directory elementary unit FDE (File Directory Entry), which is generally applied in connection with the FAT. However, there are significant unresolved drawbacks associated with the prior art, relating, for example, to the success of storage and the possibilities to edit stored file.

If there is an unexpected power supply outage during the process of taking a video shot, during which video data is being captured using the camera sensor, then all the data that has been captured up to that point during the shooting session in question, and which has, in principle, already been physically stored on the memory medium, will normally be lost. Even though the data is already stored on the memory card during the video shoot, its location on the storage areas of the memory card has not yet been updated in the bookkeeping of the card, in such a way that it can be used from it later. The data that has been shot and already stored on the memory card thus cannot be restored along with the power supply. An uncontrolled interruption in the power supply can be caused, for example, by the device's battery becoming detached, or also by it running out of power. Such situations are quite common, particularly precisely in portable devices.

In addition, it is difficult to edit video recordings of a large file size, due to the limited storage and memory capacities of memory cards. Once a long video recording has been successfully terminated and the video file has been stored on the memory card, it is quite a large size. For example, a VGA-level recording, in which, for example, 30 frames per second are captured, may result in a file of as much as 1.35 gigabytes. The editing of a file of this size becomes a problem, if, for example, it is wished to remove some part of the clip or cut it, for example, for copying in a second location. The conventional solution to this problem is to make an editing copy of the entire file and leave the original file untouched.

Particularly precisely in portable devices, this may not necessarily always be possible, due to their limited amount of memory and the limited storage capacity of memory cards. This is because the memory card must have a sufficient amount of space to also store the edited shot, in addition to the original shot, which may also be long. If the memory card is already nearly full initially, it will not be possible to edit long shots at all. And even if editing were to be possible within the limits of the memory card's storage capacity, it would be extremely slow, due to the limited speed of the memory card's data-transfer interface.

SUMMARY OF THE INVENTION

The present invention is intended to create a way to store data on, and read it from a memory medium, the storing process of which is more certain and more fault-tolerant than the prior art and the reading process of which is also suitable for use in environments with a limited memory capacity. For example, disclosed is a method for storing data (DATA) on a memory medium (MEM), which data (DATA) forms a file totality (FILE) and the memory medium (MEM) includes several unit-storage areas (U1-U10), and at least one first bookkeeping (FDE, FAT) is maintained of the storage state of which memory medium (MEM), which consists of information of the location in the unit-storage areas (U1-U10) of the data (DATA) belonging to each file totality (FILE), and in which storing process: the data (DATA) is stored in unit storage areas (U1-U10) and the said first bookkeeping (FDE, FAT), for example, concerning the location of the data (DATA) in the unit storage areas (U1-10), is updated, characterized in that the data (DATA) forming the said file totality (FILE) is stored as file parts (file1, file2, . . . , fileN), on the data (data1, data2, . . . , dataN) of which the said storing process is performed.

Also disclosed is an electronic device including: possible first means (CAM, CPU) for forming data (DATA), a memory medium (MEM) for storing the data (DATA) as a file totality (FILE), the memory medium (MEM) including several unit-storage areas (U1-U10), and a second means (CPU) for maintaining at least one first bookkeeping (FDE, FAT) of the storage state of the memory medium (MEM), the first bookkeeping (FDE, FAT) including information of the location in the unit-store areas (U1-U10) of the data (DATA) belonging to each file totality (FILE), and in which device the storing process is arranged to be performed, in connection with which: the data (DATA) is arranged to be created using the possible first means (CAM, CPU), and which is arranged to be stored as a file totality (FILE) in the unit-storage areas (U1-U10), and the said first bookkeeping (FDE, FAT) is arranged to be updated using the second means (CPU), for example, to concern the location in the unit-storage areas (U1-U10) of the data (DATA) forming the file totality (FILE), characterized in that the device also includes means (CPU): for storing the data (DATA) forming the said file totality (FILE) as file parts (file1, file2, . . . , fileN), on the data (data1, data2, . . . , dataN) of which the said storing process is arranged to be performed.

In addition, the invention also relates to program products for the storing and reading of data, a method for reading data, and a memory-card device. For example, disclosed is a program product for storing data (DATA) on a memory medium (MEM), which program product includes a storage means (MEM2) and program code, written on the storage means (MEM2), to be executed on processor means (CPU), by means of which the data (DATA) is arranged to be stored on the memory medium (MEM) as a file totality (FILE), the memory medium (MEM) including several unit-storage areas (U1-U10), at least one first bookkeeping (FDE, FAT) being arranged to be maintained of the storage state of which memory medium (MEM), and including information of the location in the unit-storage areas (U1-U10) of the data (DATA) belonging to each file totality (FILE), and in which storing process: the data (DATA) is arranged to be stored as a file totality (FILE) in the unit-storage areas (U1-U10) and the said first bookkeeping (FDE, FAT) is arranged to be updated concerning the location of the data (DATA) in the unit-storage areas (U1-U10), characterized in that the program code includes: a first code means configured to store the data (DATA) forming the said file totality (FILE) as file parts (file1, file2, ..., fileN), on the data (data1, data2, ..., dataN) of which the said storing process is arranged to be performed.

Further disclosed is a method for reading data (DATA) from a memory medium (MEM). which data (DATA) to be read forms at least part of a file totality (FILE) and the memory medium (MEM) includes several unit-storage areas (U1-U10), and at least one first bookkeeping (FDE, FAT) is maintained of the storage state of which memory medium (MEM). which consists of information of the location in the unit-storage areas (U1-U10) of the data (DATA) belonging to each file totality (FILE), and in which reading process: information of the location of the data (DATA), belonging to the file totality (FILE) to be read, or to at least part of it, in the unit storage areas (U1-U10), is retrieved from the said first bookkeeping (FDE, FAT), and the data (DATA) is read from the unit storage areas (U1-U10) defined by the said location information, characterized in that the data (DATA) forming the said file totality (FILE) is read as one or several file parts (file1, file2, ..., fileN), on the data (data1, data2, ..., dataN) of which file parts (file1, file2, ..., fileN) the said reading process is performed, in order to assemble the file totality (FILE) for the desired use.

Also disclosed is a program product for reading data (DATA) from a memory medium (MEM), which program product includes a storage means (MEM2) and program code, written on the storage means (MEM2), to be executed on processor means (CPU), by means of which the data (DATA) is arranged to be read from the memory medium (MEM) as a file totality (FILE), the memory medium (MEM) including several unit-storage areas (U1-U10), and at least one first bookkeeping (FDE, FAT) being arranged to be maintained of the storage state of which memory medium (MEM), and including information of the location in the unit-storage areas (U1-U10) of the data (DATA) belonging to each file totality (FILE), and in which reading process: information of the location, in the unit-storage areas (U1-U10), of the data (DATA), or at least part of it, belonging to the file totality (FILE) to be read, is arranged to be retrieved from the said first bookkeeping (FDE, FAT), and the data (DATA) is arranged to be read from the unit-storage areas (U1-U10) defined by the said location information, characterized in that the program code includes: a first code means configured to read the data (DATA) forming the said file totality (FILE) as file parts (file1, file2, ..., fileN), on the data (data1, data2, ..., dataN) of which the said reading process is arranged to be performed and, in addition, a second code means configured to assemble the file totality (FILE) from the said file parts (file1, file2, ..., fileN).

Also disclosed is a memory medium (MEM), which is arranged to be used in the afore-referenced electronic device.

Still further disclosed is a memory medium (MEM), which is arranged to be used in the afore-referenced method.

In the method according to the invention for storing data in a memory medium, the data consists of a file totality and the memory medium of several unit storage areas. At least one first bookkeeping is maintained of the storage state of the memory medium, this consisting of information of the location, in the unit storage areas, of data belonging to each file totality. In the storing process, data is stored in the unit storage areas and the said first bookkeeping is updated, for example, concerning the location of the data in the unit storage areas. In the method, the data forming the file totality is stored, surprisingly, as individual file parts, on the data of which the storing process is carried out. According to one embodiment, it is possible to maintain a second bookkeeping of the file parts belonging to the file totality. It is also possible to implement a solution without any special additional bookkeepings.

According to a first embodiment, the storing process can be performed mainly simultaneously with the creation of the data. In connection with the invention, the creation of data can be understood very broadly. It can include, for example, digital video imaging, without, however, excluding other forms of data creation.

According to one embodiment, the data forming the file totality can also include various kinds of header data. One example of this is format-specific data, on the basis of which at least part of the individual file parts can be assembled into a set file format, to form a single complete file.

According to a second embodiment, in the method it is possible to define the amount of memory to be used in the storing and/or data-formation process, or also other factors that may possibly affect them. On the basis of this, the size of the file parts, for example, can be adjusted to suit each situation. Besides, or instead of defining the amount of memory, it is also possible to define the power capacity to be available to the device on each occasion, on the basis of which the progress of the process can also be controlled.

Through the invention, numerous advantages relating to the storing, reading, and also editing of data are achieved. For example, if a fault or error relating to the capture of data, for example image data, occurs, the data totality, for example a video shot, is no longer completely destroyed, thanks to the invention, but only the last file part, which was being captured and stored exactly when the fault occurred. All of the previous file parts, which have thus now already been stored, can be read/used from the memory medium, once the situation has been overcome.

In addition, various editing functions carried out on the shot are substantially facilitated. Space equaling the entire shot is no longer required, on the memory card or similar, for the file being edited. Through the invention, it may even be sufficient, if there is enough space, for example, for only the file part that it is intended to edit. Also, through the invention, it is possible to process even large files in the working memory of the device.

Other characteristic features of the invention will become apparent from the accompanying Claims while additional advantages achieved are itemized in the description portion.

BRIEF DESCRIPTION OF THE DRAWINGS

The invention, which is not restricted to the embodiments presented in the following, is examined in greater detail with reference to the accompanying drawings, in which.

DETAILED DESCRIPTION

The invention relates to a method and electronic device 10 for storing data DATA on and reading it from a memory medium MEM. The data DATA forms a file totality FILE, which is intended to be unified. One example of this that can be referred to is a video file containing sound and images, which is also known as a multimedia file.

The file totality FILE can thus be formed, for example, using camera and/or microphone means CAM, MIC that possibly belong to the device 10, without, however excluding other types of formation. Similarly, the file FILE can also be brought in some way to the device 10. One example of such a way is the downloading or receiving of the file FILE over a data-transfer network from some other device. Though in the following the invention is described in greater detail by applying a video shot, it is in no way, however, restricted to only such ones.

Figure 1:
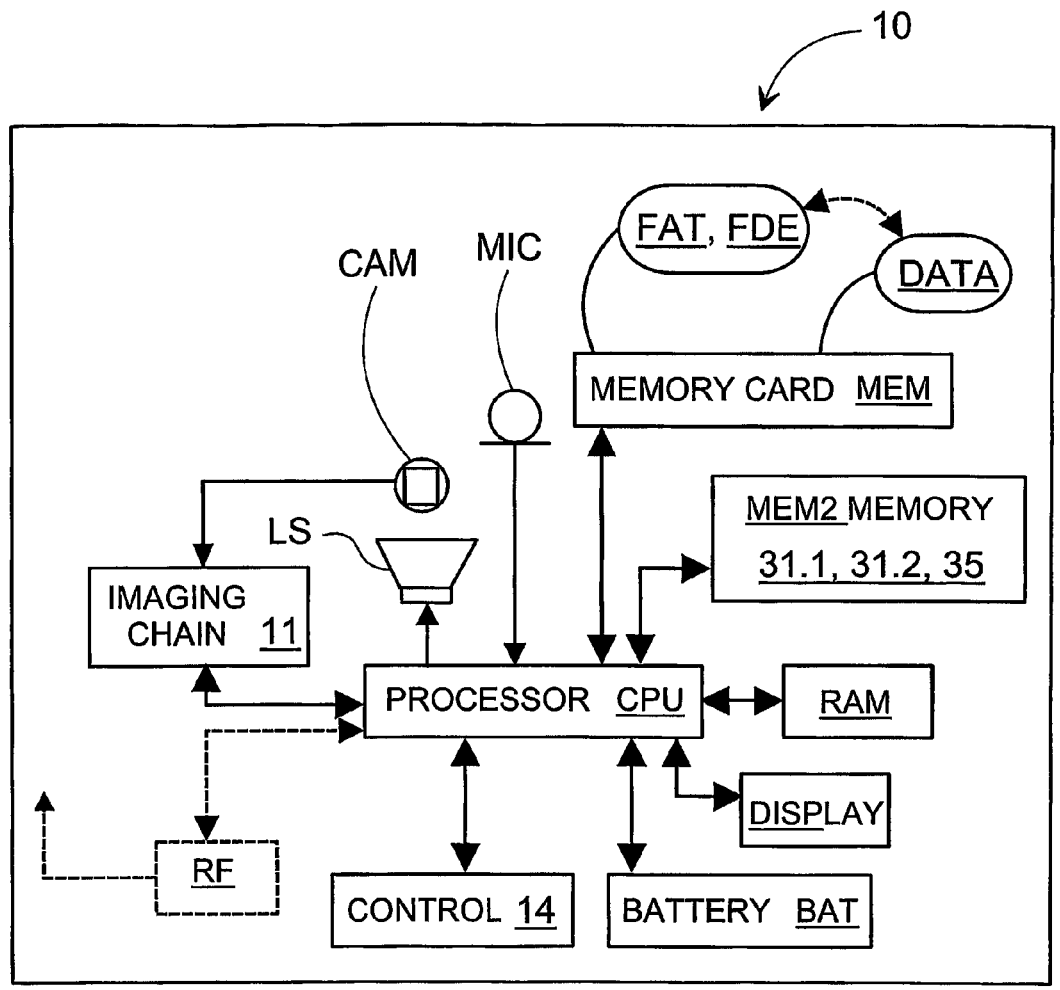
FIG. 1 shows a rough schematic diagram of an electronic device according to the invention.

FIG. 1 shows an example of the electronic device 10 according to the invention. The device 10 can be, for example, a digital camera device, or a mobile station 10 equipped with camera means CAM, more generally a portable device equipped with a digital imaging capability. In the case of a mobile station, the device 10 also includes a transmitter/receiver functionality RF, which is, as such, known, which there is no need to describe in greater detail in this connection. Microphone and loudspeaker means MIC, LS are also possible, as is also a display element DISP.

The device 10 can include possible first means CAM, CPU for creating the data DATA. The data creating means can be, according to the embodiment, for example, a camera sensor CAM and/or a microphone MIC. The data DATA produced using them is processed into a digital form using processor means CPU. In addition to these, the device 10 can also be equipped with an image-processing chain 11, which is, as such, known, by means of which the image data DATA formed using the sensor CAM is processed in a desired manner.

Further, in the device 10 itself, or in connection with it, there is also a memory medium MEM, which can be connected to it in some way. The memory medium MEM can be a memory card MEM or a hard disk, of a type that is, as such, known, or is still under development, in which the data DATA can be stored, for example, in a manner that is, as such, known, as a file totality FILE. The memory medium MEM can be of a so-called rewritable type. In that case, the data DATA can be deleted from the memory medium MEM and, as a result of the deletion, the storage area that is released can be reused to store new data. Generally, the memory medium MEM can be of a 'tapeless' type, so that, when it is applied, for example, in a portable camera device, it is possible to refer to 'camcorders'.

Figure 2:
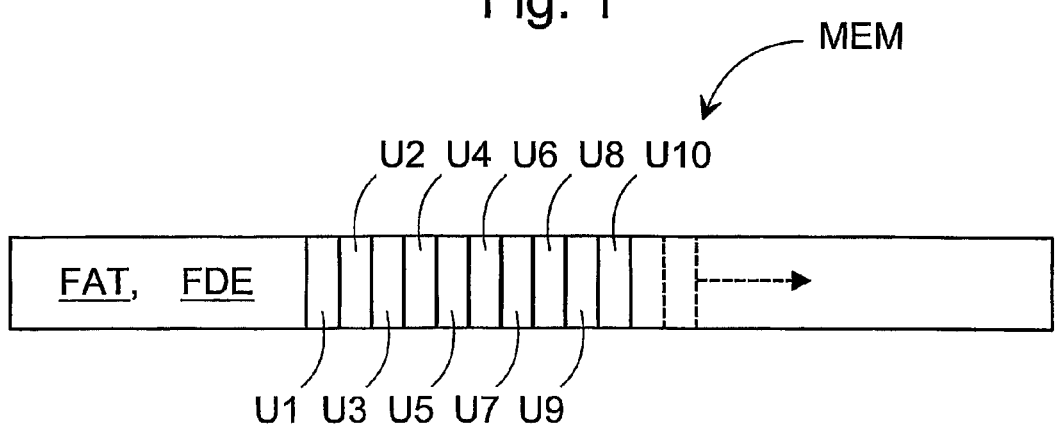
FIG. 2 shows an example of the logical division of the memory medium.

FIG. 2 shows a highly schematic example of the memory medium MEM and even more particularly of its logical division into storage areas. The invention also relates to a memory medium, for example, a memory card MEM, for use in connection with the methods and the device 10. The memory medium MEM can be divided, or it can be arranged virtually to include several unit storage areas U1-U10, on which the data DATA can be stored, for example, by the processor CPU, or equally it can be read or also deleted.

At least one first disk bookkeeping FDE, FAT, which can also be located on the memory medium MEM, can be maintained of the storage stage of the memory medium MEM, more particularly of the unit storage areas U1-U10. On the other hand, the disk bookkeeping FAT, FDE can also be, in a certain way 'virtual', as, for example, may be the case in a memory card. In that case, the device 10 can regard the card MEM as a single memory-area totality and the actual disk bookkeeping is created or maintained in the device 10 in some way, for example, on the program level.

The information depicting the storage state can be, for example, information on the free and reserved unit-storage areas. U1-U10 and, further, on the location of the data DATA, belong to each file totality FILE, on these unit-storage areas U1-U10 of the memory card MEM.

One example of the first bookkeeping is based on the use of an, as such known, space allocation table, i.e. FAT (File Allocation Table). The bookkeeping can then also include a directory, in which there are directory elementary units FDE. They state, among other things, the starting point of the files FILE on the unit-storage areas U1-U10 on the memory medium MEM. The first bookkeeping FDE, FAT can read and update using the processor means CPU, for example, concerning the location, on the unit-storage areas U1-U10, of the data DATA forming the file totality FILE. The characteristic features of the FAT technology are also well known to one versed in the art, for which reason a more thorough investigation of them is not necessary in this connection.

Figure 3:
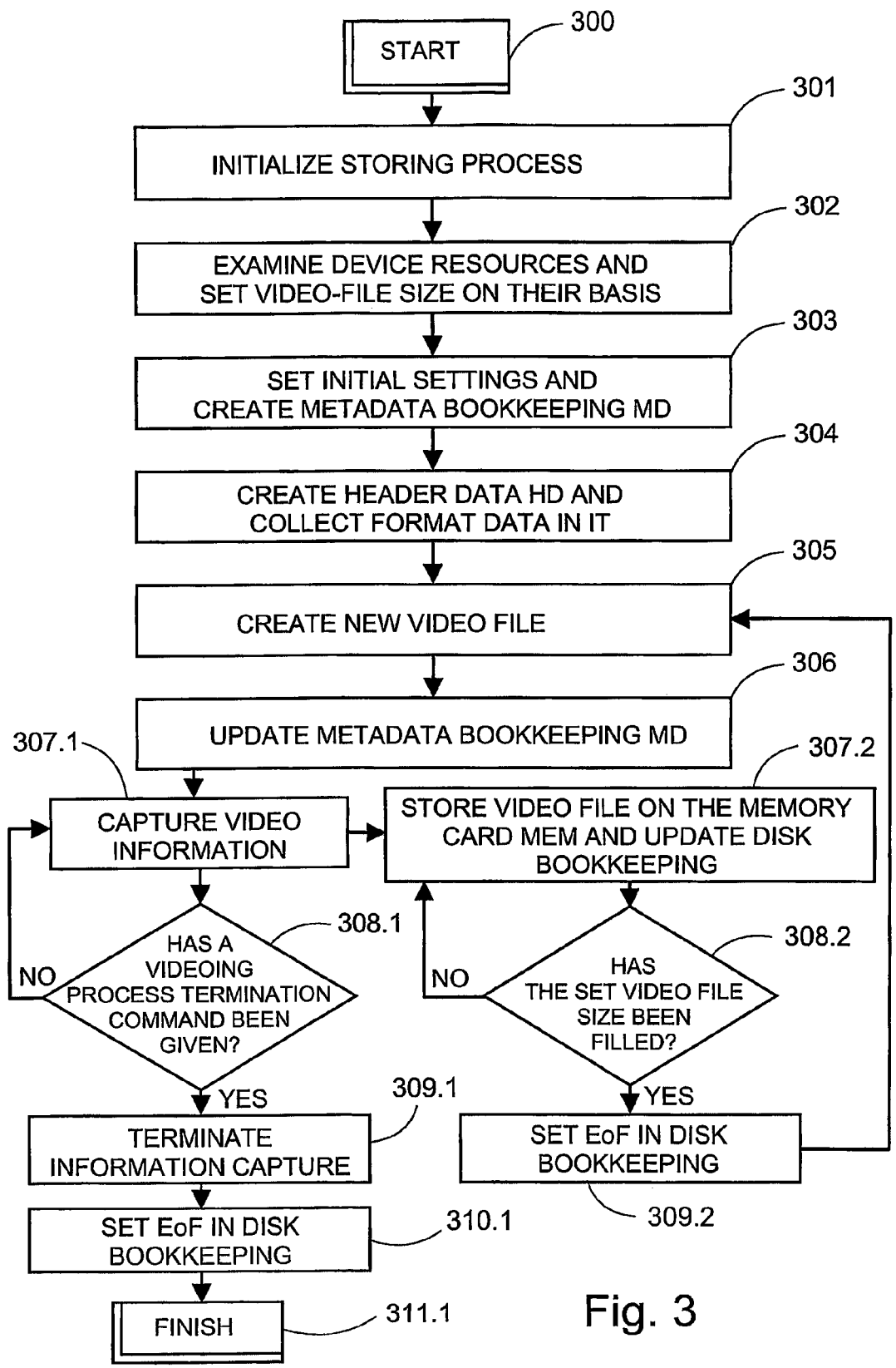
FIG. 3 shows a schematic flow diagram of an example of the method according to the invention, when storing data.

In the following, the method of storing data, more particularly video data DATA, is described, with reference to the device 10 shown in FIG. 1, the flow diagram shown in FIG. 3, and the manner of arranging files on the memory medium MEM shown in FIG. 4. The invention not only relates to storing, but also to reading data DATA from the memory medium MEM and, in addition, also to program products 30.1, 30.2, for implementing the methods in the device 10.

Figure 4:
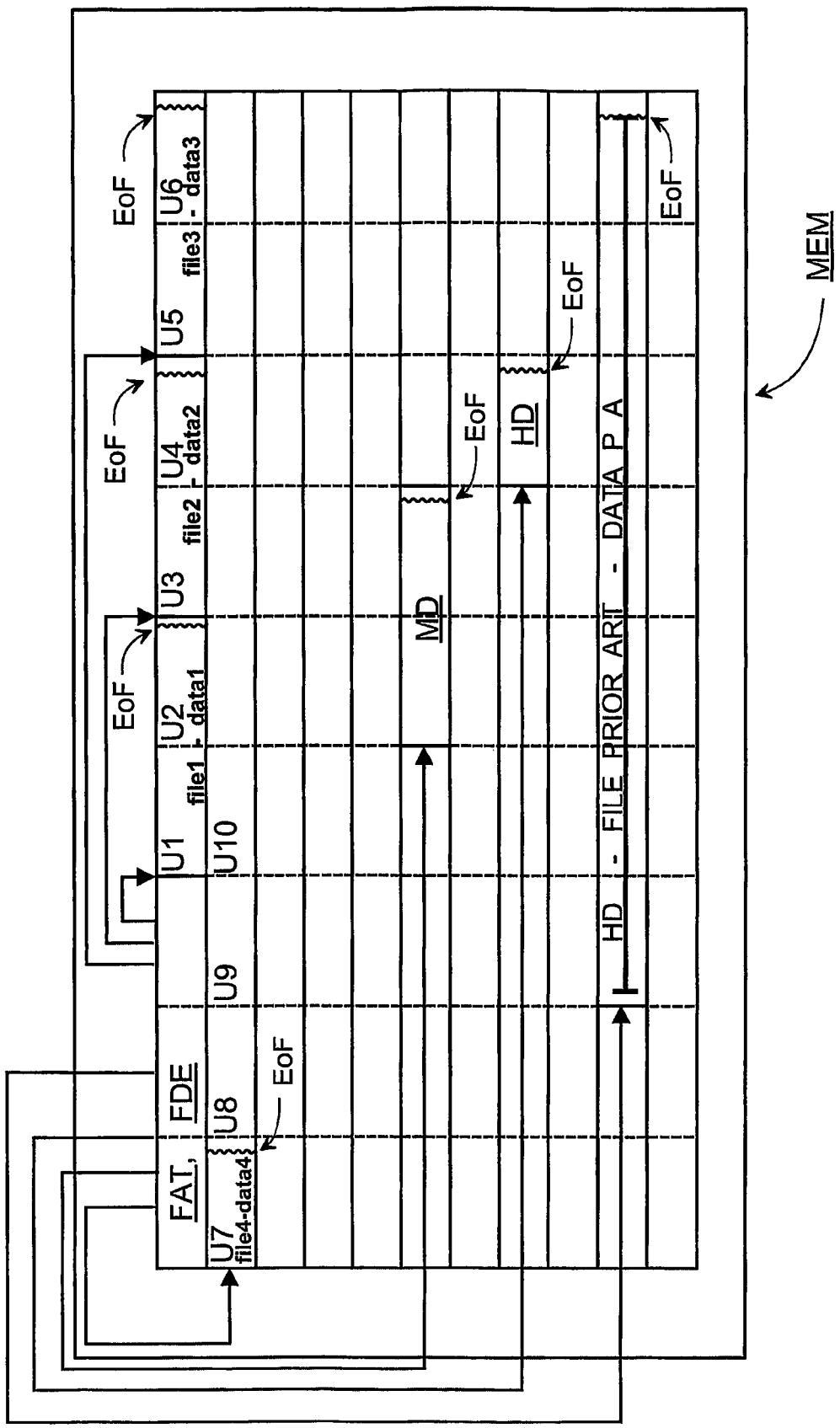
FIG. 4 shows schematically an embodiment of the manner, according to the invention, of arranging data on the memory medium.

FIG. 4 shows some examples of the memory card MEM and of the memory-area division in it FAT, FDE, U1-U10, which should be understood to be extremely schematic. The second lowest memory-area row shows a way, according to the prior art, for storing the data DATA_F_A, belonging to an individual file FILE_PRIOR_ART, on a memory card MEM. It should be understood, that the arrangement of the files FILE_PRIOR_ART, file1, file2, shown in FIG. 4, on the memory card MEM is very schematic. The data DATA_P_A, data1, . . . , data4, belonging to the files FILE_PRIOR_ART, file1, . . . , file4, may be and often is spread separately from each other over different unit areas of the memory card MEM, are thus not at all sequential, as now shown in FIG. 4 for reasons of simplicity.

In the prior art, the data DATA_F_A forming the continuous file FILE_PRIOR_ART forms a single file totality on the memory card MEM. Thus, there is a reference to the starting point of the file FILE_PRIOR_ART in the directory elementary unit FDE while the location of the data DATA_P_A, belonging to the file FILE_PRIOR_ART is in the file allocation table FAT. The file FILE_PRIOR_ART, together with its data, now includes header data HD and video data DATA_P_A, both of which are, according to the actual disk bookkeeping of the memory card MEM, essentially in the same file FILE_PRIOR_ART. In the final unit block of the file FILE_PRIOR_ART, there is a special identifier stating the end of the file, for example, EoF (End of File). Thus, numerous problems, which have already been referred to, are associated with such a file FILE_PRIOR_ART, which is stored as an essentially unified totality.

In the storing process according to the invention, the video data DATA, intended to form a single unified video-shot file totality FILE, is, surprisingly, stored as splitted file parts, as sequentially and continuously repeatable video clips. file1, file2, ..., file4. A storing process, in which their data data1, data2, ..., data4 is stored in the unit-storage areas U1-U7 of the memory card MEM, is performed for the data data1, data2, ..., data4 of the each file parts file1, file2, ..., file4. The storing process can be performed, for example, in connection with the creation of the data data1, data2, ..., data4. The storing process according to the invention can also be performed separately from the actual data formation process, for example, as post-processing.

In connection with the storing process, a first bookkeeping FDE, FAT updating process, as such known from the disk bookkeeping of the memory medium MEM, is performed for each file part file1, file2, ..., file4. In it, the first bookkeeping FDE, FAT is updated in a known manner, concerning, for example, the location of the data data1, data2, ..., data4 in the unit-storage areas U1-U10. FIG. 4 shows an example of the memory card MEM, in which the invention is applied. A video shot FILE is stored according to the method of the invention is stored as follows in the first and second unit-block rows. The file's file1 data data1 is in the areas U1, U2; the file's file2 data data2 is in the areas U3, U4; the file's file3 data data3 is in the areas U5, U6; and the file's file4 data data4 is in the area U7. The end of each file file1, ..., file4 is shown by a EoF mark.

Next is a description of the method of storing data, illustrated by an example of an application. With reference to the application example of FIG. 3, the user of the device 10 wishes to use the device 10, for example, to perform video imaging. In stage 300, the user activates the video-storing functionality CPU, 11, CAM, MIC in the control section 14 of the device 10. As a result, in stage 301, the device 10 performs the necessary initializations for performing video shooting and storing.

In stage 302, the device 10 can, for example, using the processor means CPU, define various variables relating, for example, to the properties of the device 10 and the available device resource variables, which may relate to the video recording and/or storing process. A few examples of these are the definition of the amount of memory, for example of the working memory RAM, available for video recording and/or storing, the size of the unit-storage areas U1-U10 of the available memory medium MEM, and/or the power capacity at the moment of the battery BAT of the device 10.

On the basis of the definitions, the progress of the video recording and/or storing process can be adjusted, for example, the size of the files file1, file2, ..., file4 to be stored. Monitoring of this kind can be performed in addition to, or instead of at the initial operations of storing, also during the actual video recording and/or storing process. On the other hand, the size settings for the files file1, file2, file4 can, naturally also be set by the action of the user.

The use of initial definitions/monitoring achieves several important advantages, especially in portable devices 10. On the basis of the amount of memory, particularly the size of the working memory RAM, the size of the files file1, file2, ..., file4 can be set to be as optimal as possible, for example, in terms of the information creation, storing, or editing process. If the amount of available working memory RAM is small, due to device resources or some other reason, the size of the file parts file1, file2, ..., file4 can then be smaller. A video shot FILE of the same size can then contain more files file1, file2, ..., file4.

A corresponding advantage is also achieved through the size of the files file1, file2, ..., file4 set on the basis of the size of the unit areas U1-U10. In that case, the method according to the invention does not unnecessary waste the storage capacity of the memory card MEM, even though the data DATA belonging to the video shot FILE is stored as several files file1, file2, ..., file4. The unit areas U1-U10 are then precisely filled so that there is practically no waste space at their finish.

Further, setting the size of the file parts file1, file2, file4 on the basis of the power capacity of the battery BAT achieves an advantage, for example, relating to possible fault situations. If the power capacity of the battery BAT of the device 10 is low, then it is possible that the video shooting/storing process will be interrupted in the middle of shooting/storing. There is then the danger of losing the last file part, which was being created and stored on the memory card MEM at the moment when the power ran out. If the size of the file parts file1, file2, ..., file4 is set to be sufficiently small, taking into account the available power capacity, then in that case only a small part of the end of the entire video shot FILE will be lost. The size of the files file1, file2, ..., file4 being stored can be reduced (or enlarged) even during video recording.

Beside the above monitoring possibilities, the size, or rather the points that they change, of the files file1, file2, file4 being created can also be adjusted by analysing the captured video data DATA, which is being created using the device 10. If some static moment, or alternatively a suitably dynamic moment is detected in the shot, the point of change of the file parts file1, file2, ..., file4 can be performed at that point. The purpose of the analysis of the shot FILE that takes place during the storing process is to fit the change of the file parts file1, file2, ..., file4 to a point in the shot, in which the user will not notice the possible point of change, i.e. the 'seam' between the file parts file1, file2, file4.

Of course, the size of the files file1, file2, ..., file4 can also be defined by the user. In that case, the user can, for example, estimate whether they intend, for example, at some stage to edit the video FILE that they are intent to create, or also estimate the total length of the video shot FILE. If the user has such an intention, it may be preferable for the file parts file1, file2, ..., file4 to be made smaller, in order to make them smoothly editable, using the same device 10, which may have a limited memory capacity.

As the next stage 303, the initial settings can be set and, according to one embodiment, a possible second bookkeeping MD can be created. In the second bookkeeping MD, it is possible to maintain information on the data of the video shot FILE, for example, on the files file1, file2, ..., file4, HD forming it. The user can be requested for the filename to be given to the video shot FILE already in connection with the setting of the initial settings. This can be understood as a kind of project identifier, a prefix, according to which the files MD, HD, file1, ..., file4 forming the complete video shot FILE will be named. Because the information is requested already in the starting stage, this is used to ensure the success of the storing of the shot, without it having to be requested from the user, for example, in the middle of the shot, or, according to the prior art, only once the shooting is finished.

Further, in the initial settings it is possible to also set the file format, in which it is wished to store the actual video shot FILE so that it can be reproduced. By defining the format prior to commencing storing, the advantage, among others, is achieved that the video data can then be processed already in the storing stage in a manner that is advantageous to the reproduction format. One example of such a file format is the 3GP format, which is widely used in mobile communications technology. Other formats are naturally also possible. Some example of these are AVI, MP3(4).

Next follows a slightly more detailed description of the logical file structure according to the invention and their relation to each other. In the method according to the invention, it is possible to maintain in addition a second bookkeeping MD, for example, of the file parts file1, file2, . . . , file4 belonging to a video shot FILE, being a certain kind of metadata file (.VMD) of the video content FILE. In the metadata file MD, there is information on which file parts file1, file2, . . . , file4 belong to a specific video shot FILE and in what sequence. An embodiment without a separate metadata file is also possible. In that case, all of the prefixes are set as a single ASCII file. This embodiment will be described in greater detail towards the end of the description portion.

Figure 5:
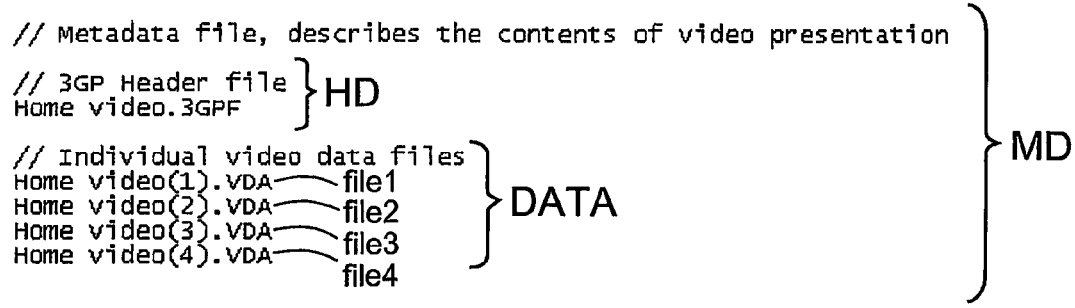
FIG. 5 shows schematically an embodiment of a meta data file according to the invention.

FIG. 5 shows an example of such a possible metadata file MD. The metadata file MD defines the file references of the data belonging to the video shot in question (the project name is now 'Home video'). It is used to assemble the desired parts of the actual video shot FILE, which is split up into file parts file1, file2, . . . , file4, once again into their intended unified continuous form. The file parts file1, file2, . . . , file4 stored on the memory card MEM are four parts (Home video(1).VDA-Home video(4).VDA) in the shot in question. Thus, in the metadata file MD there can be identifiers of the file parts file1, file2, . . . , file4 containing the video data, for example, their names and also the order of assembling them together when making an actual 3GP file FILE according to the standard.

The sequence of assembling the file parts can be included, for example, as running numerical information in the filenames, which is given by the program product 31.1 performing the storing. In the metadata file MD, there can also be information HD relating to format-specific aspects of the file FILE to be assembled. The metadata file MD may even have a text format. On the other hand, even an encrypted, for example, an application-specific format may be considered. In the metadata file MD in FIG. 5 there are comments, which are distinguished by the // mark at the beginning of the row.

The second bookkeeping MD can additionally include special header data HD. On the other hand, the header data HD can also form its own file, in which case the metadata file MD may contain only a reference to this header-data file HD stored on the memory card MEM. In FIG. 5, the header-data file HD includes one 0.3GPH-type header file. The header-data file HD is created in stage 304 and in it is collected the header data (not shown) corresponding to the set file format, which is obtained, for example, for the video-data circuit 11 of the device 10.

One example of the header data HD is format-specific data. With the aid of this, the file parts, file1, file2, . . . , file4 can be brought entirely or in the desired parts to the file format according to the setting, which can also be selected quite freely.

In stage 305, a new video file part file1 is created, in which the first part of the video shot FILE will be stored. In stage 306, the metadata bookkeeping MD is updated, by adding to it the identifier of the first file part file1, on the basis of which it can be found from the memory card MEM and can be placed in the correct location when assembling the continuous video stream from the files file1, file2, . . . , file4.

In stage 307.1, the imaging process is started, i.e. the creation of the data data1 using the device's 10 camera and microphone means CAM, MIC. The data data1 can be processed using the processor CPU, in connection with its generation and storing. The storing process according to the invention, can be performed mainly simultaneously with the generation of the data data1, in this case in connection with the digital video imaging. In stage 307.2, the storing of the file part file1, which includes the data data1, onto the memory card MEM is performed in a manner that is, as such, known, while simultaneously updating the first disk bookkeeping FAT, FDE.

In stage 308.1, i.e. in connection with the capture of the image information, the device 10 can simultaneously monitor whether a command comes from the user to terminate the imaging. If a termination command is not received, the imaging is continued (stage 307.1). However, if a termination command is received, the process moves to stage 309.1, to terminate the shooting process. In stage 310.1, operations that are, as such, known are performed on the first disk bookkeeping FAT, FDE, for example, the indication EoF (End of File), which states the end of the file, is set for the file part file4 that is being stored at that moment. Correspondingly, the metadata file MD is also closed by setting an EoF identifier to the unit-block area of its end item, which states the end of it. After this, the imaging/storing process has terminated (stage 311.1).

In connection with the storing process carried out in stage 307.2, it is possible to also perform a condition examination 308.2. In it, the filling of the set part-file size can be monitored. If data dataC can still be fitted into the file part fileC (C=current) being stored at that moment, then a return is made to stage 307.2, in which the storing process is continued in the current file fileC. If the set part-file size becomes full, a move is made to stage 309.2. There, an EoF mark stating its end point is placed on the relevant file part fileC that is being closed. From stage 309.2 the process returns to stage 305, in which the next file part file(C+1) is created, in which the storing of the video data is continued. Due to the disk bookkeeping and other similar updating processes, it may be necessary to buffer the video data in the working memory RAM, in order to permit storing in the manner according to the invention. One such situation, in which buffering may be necessary, is precisely in connection with the changeover of the file parts fileC, file(C+1) (stages 309.2, ->305, 306).

Figure 6:
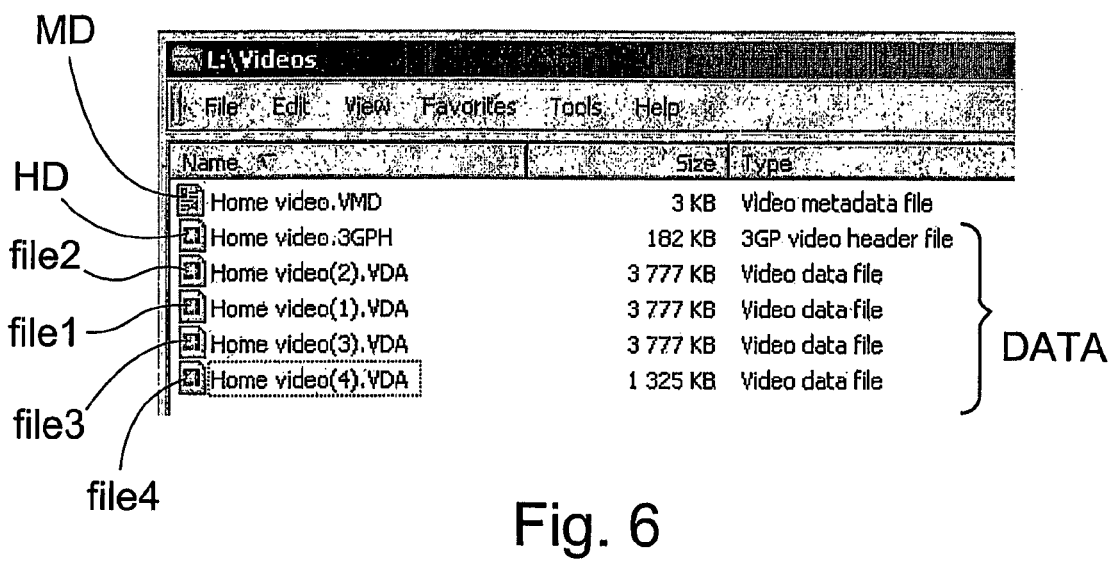
FIG. 6 shows an example of a file listing according to an embodiment.

In the application example shown in FIG. 6, an example directory list is shown, in which the invention is applied as described above. In the video shooting in question, the user has given the video shot the project name 'Home video'. The files MD, HD, file1, file2, . . . , file4, belonging to the shot, are named according to this. Corresponding file identifiers are added to the filenames. For example, the .VMD identifier can be used as the identifier of a metadata file MD in a text format, the 0.3GPH identifier as the identifier of the header data file HD, and the .VDA identifier as the identifier of the video-data files file1, file2, . . . , file4. In addition, corresponding sequence indicators, for example, a numerical suffix, can be added to the video-data files file1, file2, . . . , file4. This is used to indicate the sequence of the data data1, data2, . . . , data4, containing in the files file1, file2, file4, in the actual video shot FILE. If, for example, there is a video shot with a duration of 15-30 seconds in one of the file parts file1, file2, . . . , file4, the size of the file formed will be about 4 Mb.

The use of the method according to the invention can also solve, for example, the directory limitation problem relating to FAT16 disk bookkeeping. According to the prior art, only 512 files can be arranged in a single directory or folder. The method according to the invention solves this problem in such a way that the application 31.1 is used to control the storing of the files file1, file2, . . . , file4 on the memory card MEM, as a result of which they can be stored in different folders, if one folder becomes full.

The header data file 0.3GPH can have a corresponding format to that of a standard 3GP file. Only its file identifier is different, thus expressing its difference from a standard 3GP file. The only difference between these files in this application is that there is only header data HD in the header-data file HD, and thus no actual video data at all. All the video data is now in the file parts, i.e. now in .VDA-type files.

The file parts, i.e. the .VDA-type files now contain only video data, which has been captured and processed as video data using the device 10. In the file parts file1, file2, file4 there is no header data at all relating to the video format.

Figure 7:
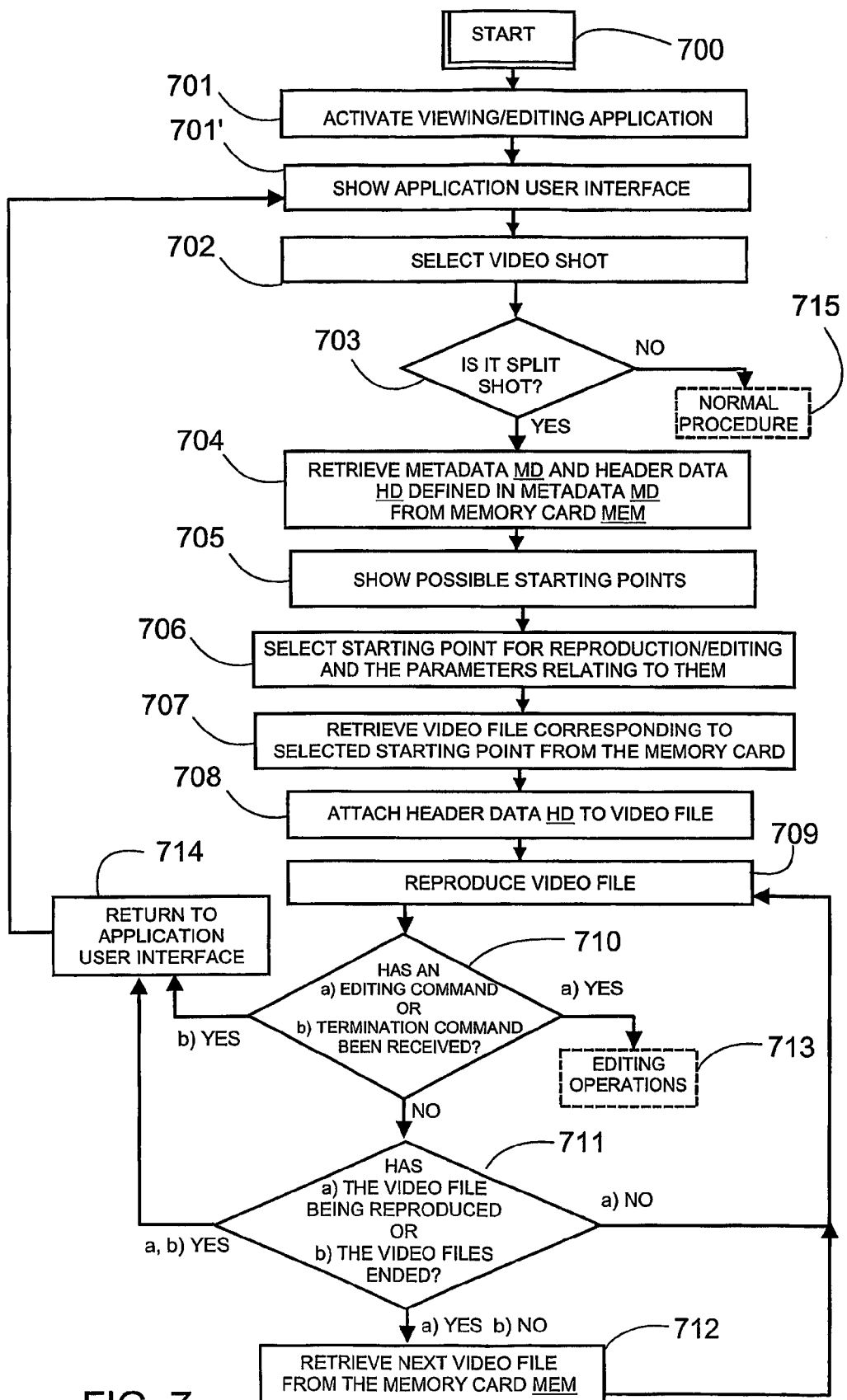
FIG. 7 shows a schematic flow diagram of an example of the method, according to the invention, when reading data from the memory medium.

FIG. 7 shows an example of a flow chart of the method according to the invention for reading the data DATA from the memory medium MEM, to which the invention also relates. The reading of the data is described with reference to the application examples presented above, in which a video shot was stored according to the invention on a memory card MEM.

The data DATA to be read from the memory card MEM can form a complete video shot FILE intended to be unified, which must thus be created in a single continuous video shooting session. On the other hand, the data to be read can also include only a part of a complete video shot, which can begin at one point selected by the user and end at another point selected by the user. Without particularly excluding any reading intention, the operation 'reading' can be understood to be the retrieval of data from the memory card MEM for some purpose of use.

In stage 700, the user wishes to open for a selected purpose of use a video shot FILE, or some part of if, which he or she has stored on the memory card MEM. In stage 701, the user activates from the device 10 the application 35, which can be, according to the embodiment, any compatible 3GP player at all, or some other, depending of course on the reproduction format.

For example, in a PC environment, it is possible to apply PC-Suite-type applications, or some other conversion applications, in order to reproduce/assemble a file totality FILE stored according to the method. The application 35 arranged in the device 10 can be intended, for example, to reproduce and/or edit a video shot FILE. As a result of the activation of the application 35, in stage 701', the interface of the application 35 is shown on the display DISP of the device 10. As such, this can be adapted for a known type of players.

In stage 702, the video shot FILE, FILE_PRIOR_ART can be selected in the interface of the application 35. As a result of the selection, the application 35 can check, as stage 703, whether the selection concerns a video shot FILE created according to the method of the invention. If it is not such a file, the process moves to the procedure chain 715, which corresponds to the stages according to the prior art for reproducing and/or processing video shots FILE_PRIOR_ART.

However, if it is a video shot FILE stored, i.e. partly split up according to the method of the invention, in stage 704, according to one embodiment, the metadata file MD corresponding to the video shot FILE is retrieved from the memory card MEM to the memory RAM of the device 10. At the same time, the header-data file HD, defined in the metadata file MD, can also be retrieved to the memory RAM.

The number (N) of file-parts file1, . . . , fileN, in which the video shot FILE is stored on the memory card MEM according to the invention and in what sequence can, for example, be interpreted from the metadata file MD, or even only from the directly file listing (the embodiment will be described later). In stage 705, the header data HD retrieved to the working memory RAM can be attached to the start of each file part file1, . . . , file4, and, for example, the first frame of each file file1, . . . , file4 can be shown in the interface of the application 35. This requires the file parts file1, . . . , file4, or at least their initial parts, to be also retrieved, each in turn, from the memory card MEM to the working memory RAM of the device 10, so that the first frames can be created and the header data HD attached to them. From the frames shown on the display DISP, the user can select, for example, the starting point of the reproduction and at the same time give the possible parameters for the reproduction or the possible editing of the video shot FILE. Of course, it will be obvious to one versed in the art to also apply more developed ways to the reproduction of the video shot, or to the search for its starting point, an example of which is the 'Sliding Mode' known from the Windows MediaPlayer application.

Once the user has selected, in stage 706, the starting point for the reproduction or editing, and the possible parameters relating to them, then the first video file file1, . . . , file4 corresponding to the selection is retrieved from the memory card MEM to the working memory RAM of the device 10 in stage 707. The retrieval may take place according to the prior art, in which the file space allocation arrangement FAT, FDE of the memory card MEM is applied. As is known, using this, the location information of the data data1 belonging to the file totality file1 to be read, in the unit-storage areas U1, U2 of the memory card MEM, is retrieved from the first disk bookkeeping FDE, FAT, and the data data1 is read from the unit-storage areas U1, U2 defined by the location data.

In stage 708, the header data HD, which is used to define the reproduction format of the video file FILE, is attached to the start of the video file file1 starting at the reproduction point (the reproduction thus now starts from the beginning of the video shot FILE). After this, the reproduction of the video file FILE is started in sequence from the first selected file part file1 (stage 709).

If, during the reproduction of the video shot FILE, the user wishes to interrupt the reproduction, this can be detected in stage 710(b). As a result, it is possible to return, as stage 714, to the interface of the application 35, or to a corresponding stage, from which the use of the device 10 can be continued (stage 701').

Further, during the reproduction, it is possible, as stage 710(a), to also monitor whether the user gives possible commands relating to the editing of the video shot. If such a command is received, the process moves to stage 713, which represents the editing portion of the application 35. It is not necessary to describe it here in greater detail, as the various operations relating to the editing of video shots, and how they are implemented in applications, will be obvious to one versed in the art.

However, as a possible example of editing, reference can be made to such an application situation, in which the user intends to pick of a shorter video clip from a long video shot, for example, to be sent over a data-transfer network to another device. In that case, the user may, in stage 706, have given, in a set application-specific manner, parameters/commands relating to editing, which command the application 35 to form a video clip, starting from the starting point selected by the user. When reproducing the video shot FILE, the user can give an editing command at the point they wish, where they want to end the formation of the video clip. At the same time, the video clip can be stored on the memory card MEM, under a name given by the user.

The storing of the video clip can also take place according to the method of the invention, or also, of course, using a known method of the prior art, i.e. as a single complete continuous video-clip file, including, in a single file, both the header data and also the video data. Assembly at a single continuous file FILE_PRIOR_ART according to the prior art may also be necessary in cases in which the clip or file is being transferred to another device, which is not equipped with functionalities for processing a file stored according to the method of the invention.

If both the condition examinations of stage 710 are untrue, the process moves to stage 711. If the file file1 to be reproduced is close to its end, this can be find out in stage 711(b) and examine, for example, from the metadata file MD, which is preferably already available to the application 35 in the working memory RAM of the device 10, whether any file parts are still left. If the numerical identifier N is in the name of the file part that is being reproduced at that moment and is approaching its end, the metadata file MD can be examined, in stage 711, to determine whether there is still a following file, in the name of which there might be the numerical identifier N+1. If such a file is not found, a return is made, as stage 714, to the interface of the application 35, or to a corresponding state, from which the operation of the device 10 can be continued (stage 701').

Instead, if, when the video file file1 being reproduced at that moment is nearly ending, it is found out in stage 711 (a&b) that there are still other video files left, (i.e. that the video files have not ended yet), in stage 712 the next video file file2 is retrieved from the memory card MEM to the working memory RAM of the device 10 for reproduction. The retrieval of the file file2 and its attachment to the file file1 that is ending can preferably take place seamlessly, in such a way that the user does not notice the changeover between the files file1, file2 being reproduced. As a result, the assembly of the video shot FILE in the reading process takes place extremely smoothly. Next, the flow chart returns to the reproduction loop, which begins from stage 709. This continues, until some of the conditions of the stages 710 or 711 are met, or remain unmet in a set manner, and as result a return is made to the interface of the application 35.

Figure 8:
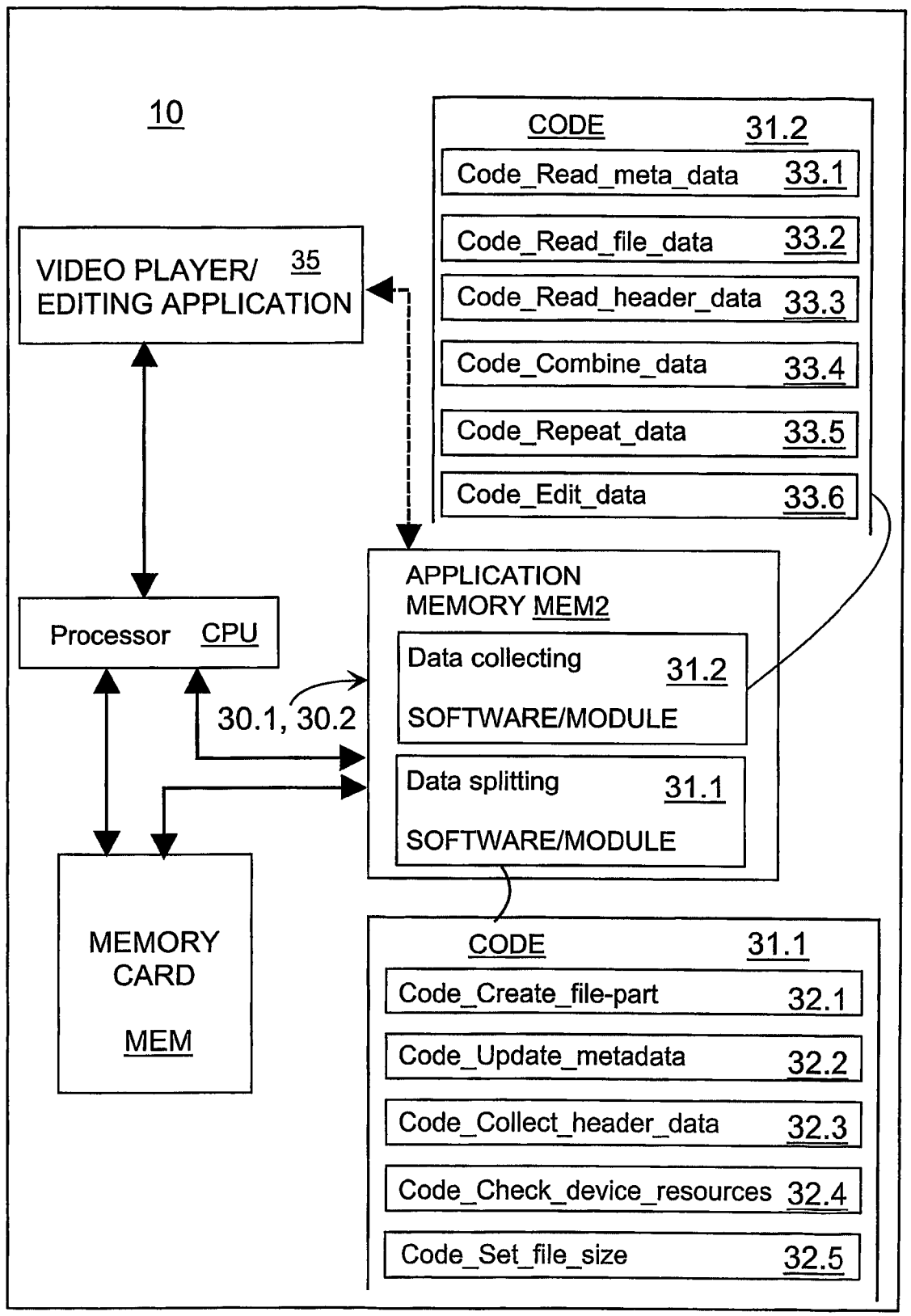
FIG. 8 shows some examples of program products, according to the invention, for storing data on, and reading it from a memory medium.

FIG. 8 shows a rough diagram of an example of the program products 30.1, 30.2 according to the invention. The program products 30.1, 30.2 can include the storage device MEM2 and program code 31.1, 31.2, to be executed using the processor means CPU of the device 10 and written on the storage device MEM2, for storing the data DATA on, and reading it from the memory medium MEM. The storage device MEM2 of the program codes 31.1, 31.2 can be, for example, a memory card, or also the application memory of the device 10, in which it can be directly integrated.

The program codes 31.1, 31.2 can include several code means 32.1-32.5, 33.1-33.6, to be executed by the processor means CPU, the operation of which can be adapted precisely to the method descriptions presented above. The codes can form a group of processor commands to be performed in sequence, by means of which the functionalities desired in terms of the invention can be created.

First of all, the program product 30.1 for storing data DATA is examined. The code means 32.1 of the program product 30.1 can be configured to store the data DATA forming the file totality FILE, according to the method, as file parts file1, file2, . . . , fileN, on the data data1, data2, . . . , dataN of which the storing process according to the invention is arranged to be performed. The storing of the file parts file1, file2, . . . , fileN can be performed according to the prior art, i.e. for example on the basis of the FAT space allocation practice.

According to one embodiment, the program code 31.1 can additionally include a possible second code means 32.2. This can be configured to maintain a second bookkeeping MD of the file parts file1, file2, . . . , fileN belonging to the said file totality FILE. Using the code means 32.2, the file parts file1, file2, . . . , fileN can be arranged in the correct sequence, for example, when assembling a continuous complete video shot FILE.

Further, the program code 31.1 can also include a third code means 32.3. It can be configured to fit header data HD to the second bookkeeping MD, such as, for example, the aforementioned format-specific data. Using the header data HD, the file parts file1, file2, . . . , fileN can be assembled into a set file format FILE.

Yet a fourth code means 32.4, which can also belong to the program code 31.1, is, for example, code defining the amount of the device's 10 working memory RAM to be available in connection with the storing process. More generally, it is possible to speak of a code series 32.4 defining the device resources, because there may also be other factors to be defined. On the basis of the available resources, the code means 31.4 is configured to regulate the progress of the storing process. One example is a code means 32.5 for regulating the size of the file parts file1, file2, . . . , fileN, before the start of the storing and/or even during storing.

The program code 31.1 can be arranged to be executed mainly simultaneously with the generation of the data DATA. In connection with the invention, generation can be understood as a very broad concept. It can be, for example, digital imaging.

Next is a description of the program product 30.2 for reading data DATA from a memory card MEM. The first code means 33.2 of the program product 30.2 can be configured according to the method to read data DATA forming a file totality FILE intended to be continuous and unified, as file parts file1, file2, fileN, the reading process being arranged to be performed on the data data1, data2, . . . , dataN of the file parts. The reading of the file parts file1, file2, . . . , fileN from the memory card MEM can be performed according to the prior art, i.e. on the basis of the space allocation practice FAT.

Further, the program code 31.2 can additionally include a second code means 33.4. It can be configured to arrange the file parts file1, file2, . . . , fileN in the correct sequence, for example, when assembling the continuous complete video shot FILE. The information required for the assembly is determined using code means 33.1, which can be arranged to read from the memory card MEM the information of the files belonging to the file totality FILE, which is now the previously dealt out metadata information MD. On the other hand, according to a second embodiment, the second code means 33.1 can also, according to an embodiment described later, also directly interpret the list, which the operating system produces, formed from the files. This is described in greater detail later.

A code means, which may also belong to the program product 30.2, is a code means 33.3 for reading header data HD from a memory medium MEM. In addition, code means 33.5 and 33.6 for reproducing and editing data are, of course, also possible. In addition, in connection with the reading of the data, it is equally possible to apply code means that analyse the device resources, as was also possible in connection with the data storing.

It will be obvious to one versed in the art that the program codes 31.1, 31.2 can be implemented in a set manner, either as independent applications, or else they can also form modules, which can be integrated with or linked to other applications, such as, for example, to the reproduction/editing application 35 described above.

Even though the invention is described above as embodiments, in which a special bookkeeping MD is applied to maintain the data from the file parts file1, . . . , file4, HD forming the file totality FILE, the invention can also, surprisingly, be implemented without this second bookkeeping MD arranged as its own file on the memory medium. In that case, it is possible to apply, for example, the disk bookkeepings FAT, which are, as such, known, and from which formed, for example, the ASCII-format directory file listing it is possible to analyse, in order to determine which files file1, . . . , file4, HD possible belong to which file totality FILE. This can be find out, if the application 35 or program product 30.2 know the identifier prefix (Home video) given by the user to the totality FILE. Using this (supplementing it) the application 35, 30.1, 30.2 can search from the file listing produced by the operating system the file parts (Home video(1).VDA-Home_video(N).VDA) and the header files (Home video.3GPH) belonging to it. In this case, the marks supplementing the prefixes can be understood as running video-data file numbering and the header file suffix, which is also known to the reading/storing application 35 or program product 30.1, 30.2.

Through the invention, even files including large amounts of data can be divided into small parts during their storing stage, or even in a later stage. The invention can be applied, for example, independently of the type of memory card, the file system, or the operating system. One example of a memory card type, in which the invention can be applied, is the MMC (Multimedia Memory Card) memory cards applied in connection with mobile stations. Other already existing card types, or those which are presently being developed, are, of course, also possible. Some examples of operating systems are Symbian and Windows CE.

As has already been explained above, the method according to the invention will also facilitate the video editing process. The transfer of video data DATA performed through the data-transfer interface of the memory card MEM, drops to a fraction of that of, for example, the prior art, in which it has been the practice to copy the entire video file FILE. Through the invention, it is necessary to only load a few pieces of the video data into the processor memory RAM for the editing tasks and transfer them later back to the memory card MEM. Thus, the method permits video files FILE of even an extremely large data size to be edited in video imaging products equipped with a limited memory capacity.

The invention can be applied in numerous different applications, to which it is in no way wished to restrict the invention. A particular advantage is achieved using the method and device according to the invention in the storing and editing of, for example, large files, such as individual long video shots or similar multimedia files, in portable devices 10 onto their memory card MEM. Some additional examples, in addition to those referred to above, are various sound samples, dictation files, or music files.

It must be understood that the above description and the related figures are only intended to illustrate the present invention. The invention is thus in no way restricted to only the embodiments disclosed or stated in the Claims, but many different variations and adaptations of the invention, which are possible within the scope on the inventive idea defined in the accompanying Claims, will be obvious to one versed in the art.

The invention claimed is:

1. A method comprising:
creating data to be stored,
splitting said data into parts,
storing said split parts in unit storage areas of a memory medium,
defining an available power capacity for storing to regulate the size of said split parts,
maintaining a first bookkeeping and a second bookkeeping, and wherein said first bookkeeping is configured to comprise information on the location of said data in said unit-storage areas and said second bookkeeping is configured to comprise information on the location of said split carts of said data in said unit-storage areas.

2. A method according to claim 1, wherein said data to be stored as split parts further comprises header data.

3. A method according to claim 1, wherein during storing, an amount of memory available for storing is defined to regulate the size of said split bars of said data.

4. A method according to claim 1, wherein an identifier is given for said data to be stored as splitted parts when starting storing.

5. A method according to claim 1, wherein the data is multimedia information.

6. A device, comprising:
data creating means configured to create data to be stored,
a processor configured to split said data into parts,
a memory medium comprising unit storage areas configured to store said split parts in unit storage areas of a memory medium, and wherein said processor is further configured to define an available power capacity for storing to regulate the size of said split parts and to maintain a first bookkeeping and a second bookkeeping, and wherein said first bookkeeping is configured to comprise information on the location of said data in said unit-store areas and said second bookkeeping is configured to comprise information on the location of said split parts of said data in said unit-storage areas.

7. A device according to claim 6, wherein said data to be stored as split parts comprises header data.

8. A device according to claim 6, wherein, during storing, said processor is configured to define an amount of memory available for storing to regulate the size of said split parts of said data.

9. A device according to claim 6, wherein the data is multimedia information.

10. A computer readable medium storing a computer program code, wherein said computer program code is configured to be executed by a processor to split data to be stored into parts, to store said split parts in unit storage areas of a memory medium, to define an available power capacity for storing to regulate the size of said split parts and to maintain a first bookkeeping and a second bookkeeping, and wherein said first bookkeeping is configured to comprise information on the location of said data in said unit-storage areas and said second bookkeeping is configured to comprise information on the location of said split parts of said data in said unit-storage areas.

11. A computer readable medium according to claim 10, wherein said computer program is configured to create header data.

12. A program product according to claim 10, wherein during storing said computer program is configured to define an amount of memory available for storing to regulate the size of said split parts of said data.

* * * * *